United States Patent
Rowe (10) Patent No.: US 7,187,622 B2
(45) Date of Patent: Mar. 6, 2007

(54) APPARATUS AND METHODS FOR DETERMINING RANGE AND BEARING USING TIME-STAMPED MESSAGING

(75) Inventor: Robert D. Rowe, Victoria (CA)

(73) Assignee: University of Victoria Innovation and Development Corporation, British Columbia (CA)

( * ) Notice: Subject to any disclaimer, the term of this patent is extended or adjusted under 35 U.S.C. 154(b) by 0 days.

(21) Appl. No.: 11/090,943

(22) Filed: Mar. 25, 2005

(65) Prior Publication Data

US 2005/0219950 A1 Oct. 6, 2005

Related U.S. Application Data

(63) Continuation of application No. PCT/CA03/01505, filed on Sep. 30, 2003.

(60) Provisional application No. 60/415,208, filed on Sep. 30, 2002.

(51) Int. Cl.
    *G01S 5/28* (2006.01)
(52) U.S. Cl. ..................................... 367/131
(58) Field of Classification Search ................ 367/131, 367/127; 375/354, 356, 357; 455/456.1
See application file for complete search history.

(56) References Cited

U.S. PATENT DOCUMENTS

2002/0155845 A1* 10/2002 Martorana .................. 455/456

FOREIGN PATENT DOCUMENTS

| EP | 0 508 819 A2 | 10/1992 |
| EP | 0 933 961 A2 | 8/1999 |
| EP | 1 253 437 A2 | 10/2002 |
| WO | WO 00/64208 | 10/2000 |

* cited by examiner

*Primary Examiner*—Dan Pihulic
(74) *Attorney, Agent, or Firm*—Klarquist Sparkman, LLP

(57) ABSTRACT

An exemplary apparatus includes one or more "communicators" that are worn, carried by, or otherwise associated with a person or location in an environment. Each communicator includes a synchronizable clock and a transmitter configured to transmit a message including a respective time stamp that is based on a time determined by the synchronizable clock. The message can be transmitted acoustically or in another manner such as by RF signal, optical signal, etc. The clock can be synchronized based on, e.g., a standard clock, another synchronizable clock associated with one or more transceivers, or a selected transceiver. The time stamp can be digital or analog, and can be configured to permit estimation of distance and bearing between synchronized communicators.

58 Claims, 6 Drawing Sheets

APPARATUS AND METHODS FOR DETERMINING RANGE AND BEARING USING TIME-STAMPED MESSAGING

CROSS-REFERENCE TO RELATED APPLICATION

This is a continuation of International Application No. PCT/CA2003/001505, filed Sep. 30, 2003, which in turn claims the benefit of U.S. Provisional Application No. 60/415,208, filed Sep. 30, 2002. Both applications are incorporated herein in their entirety.

FIELD

This disclosure pertains to methods and apparatus for determining range and bearing of objects and/or persons relative to each other in any of various environments such as an underwater, terrestrial, or underground environment in which visual and/or aural contact is substantially compromised. This disclosure also pertains to methods and apparatus by which persons in any of such compromised environments communicate with one another.

BACKGROUND

In the last few years people have been entering the underwater world in ever increasing numbers for both recreation and work. The underwater environment is a dangerous one, and it is important for a diver to be aware constantly of his or her position relative to other divers and/or to hazardous obstacles. It also is important for a diver to be aware constantly of means by which the diver may escape a hazardous situation, such as to a dive boat or tender. In case of an accident it is especially important to be able to find the stricken diver quickly and, if possible, to communicate with the stricken diver.

Prevailing underwater conditions can make vision-based navigation difficult or impossible due to suspended material in the water or to lack of light (e.g., in deep or night-time dives). These conditions, as well as any of various other conditions that can arise underwater, also can substantially increase the difficulty of communication between divers working underwater. Any means by which a diver can be assisted with situational awareness, especially under unfavorable conditions, would enhance overall diver safety and hence enjoyment of this activity.

Similarly, certain types of activities conventionally are conducted, by persons that are not submerged underwater, under conditions of very low visibility such as a smoke-laden atmosphere, nighttime conditions, spelunking conditions, and the like. These conditions, similarly to unfavorable underwater conditions, can substantially increase the difficulty of communication between persons in these conditions and can seriously compromise situational and positional awareness among persons in such an environment.

Conventional systems for use underwater are unable to provide a diver with the respective locations of other members of a dive group or to provide a person in a dive boat or analogous location with the respective locations of divers of a group being tended by the dive boat. Accordingly, there is a need for improved methods and apparatus by which divers can communicate with each other and/or with an operator in a dive boat. There also is a need for improved methods and apparatus by which a diver can know the respective locations (ranges and bearings) of other divers while underwater. There also is a need for improved methods and apparatus of this general type that can be used for communications and location detection in any of various compromised environmental situations including on land or below ground.

SUMMARY

The shortcomings and needs posed by conventional methods and apparatus, as summarized above, are met by apparatus and methods as described and claimed below. Representative embodiments of apparatus include one or more "communicators" adapted to be worn, carried by, or otherwise associated with a person or location in an environment. Each communicator includes a synchronizable clock and a transmitter configured to transmit a communication message including a respective time stamp. The time stamp is based on a time determined by the synchronizable clock. The communication message can be transmitted acoustically or by other means such as by radiofrequency (RF) signal, optical signal, or other suitable signal for the particular environment (e.g., underwater) in which the communicators are used. The clock can be synchronized based on, for example, a standard clock, another synchronizable clock, a counter, an oscillator, or the like. A clock can be synchronized by being set to a particular time that is common for all the respective clocks in the communicators of a particular network, or can be synchronized by offset, as described herein. The standard used for synchronization can be separate from any of the communicators or can be associated with one or more transceivers (or a selected transceiver) of a particular communicator. The time stamp can be digital or analog, and is configured to permit estimation of distance and bearing between synchronized communicators.

A particular embodiment includes multiple "communicators" configured to be associated with (e.g., worn by or carried by) one or more divers or other personnel in an environment. A communicator is a device that includes at least one respective receiver as well as a respective transmitter. The communicator also includes a clock and a controller. The controller is configured to perform, inter alia, clock synchronizations. The communicator transmits a digitally time-stamped message, wherein the moment of transmission is encoded in the time stamp. The time-stamp desirably is encoded in a digital "word" that is of sufficient length to provide the required information. The data may be encoded using a number of methods including, but not limited to, amplitude modulation, frequency modulation, frequency-shift keying, spread spectrum, and other techniques. Multiple frequencies can be used to facilitate separation of nodes within a network of communicators. A communicator may include a "recognition ping," pulse, or other indication either before or after the time-stamped data. A particular communicator uses the time-stamped signals received from the other communicators in the network to determine both distance to and bearing of those other communicators, and generally includes electronics configured to decode message data and to provide display functions.

In a representative embodiment, the individual communicators in a network transmit at predetermined times in a time-controlled cycle. The respective position of each communicator is encoded in the time-stamped message from that communicator. The time-stamped message can include a user-identification code and can include a preset or personal message from the sending person. Causing each communicator to transmit at a respectively distinctive time reduces the possibility of message "collision." Any two or more communicators having synchronized clocks can function in a network and will be able to calculate respective bearings and ranges of other communicators in the network upon receiving time-stamped messages from those other communicators.

As noted above, the various communicators can be configured to transmit at respective assigned times to avoid message collisions. Alternatively, different communicators can be configured to transmit at different frequencies or by using different code words so that temporally overlapping transmissions can be decoded without significant interferences with each other.

Data (e.g., range and bearing data as calculated by the respective communicator) can be presented to the user on a display "screen" (e.g., LCD "screen") or other suitable display device. This screen may have provision for "backlighting" for use in low-lighting conditions.

An advantageous embodiment of a communicator is hand-held or wrist-mounted and is configured with multiple (e.g., two, three, or more as desired or required) receivers that are spatially located in a manner by which respective times of reception of time-stamped messages facilitate determinations of respective ranges and bearings to other communicators.

The processor in each communicator desirably is configured to encode preset messages into the transmitted message. The preset messages can be, for example, any of various emergency signals that can be selected and triggered manually by a diver or other person or automatically by a mechanism (such as a low-pressure-sensing device on a diver's air tank). The communicator can be configured to provide, in the transmitted message, an audible or visual alarm indication for the respective person associated with the transmitting and/or receiving communicator. For example, the alarm condition can indicate that a diver has exceeded a preset distance from one or more communicators in the network. These alarm indications can be associated with any number of events or functions of an emergency or general informational nature and can originate from different sources (e.g., diver-triggered, triggered by sensors, etc.) or from pre-programmed instructions in the communicator's controller. For example, a set of instructions can be provided to a communicator so that, as the communicator monitors available distance and bearing data, the communicator generates an alarm if the diver strays outside of a preset distance or depth limit.

The calculation of accurate range and bearing data can be facilitated by including, in the communicator, a temperature sensor, pressure sensor, salinity monitor, or the like to facilitate time-of-flight corrections for the particular characteristics of the water (or other environment) in which the communicators are present.

A communicator need not be associated with a respective person. For example, a communicator configured for underwater use can be associated with a "base" location such as a dive boat, pier, dock, fixed or floating platform, or a particular location underwater. The base communicator can include a data-input or message-input device so that a person in, for example, a dive boat can send preset messages or other information to divers underwater and working in association with the dive boat. The base communicator also can be configured to display range, bearing, and message data, and to record such data on a recording device such as a portable computer.

One or more communicators also can be configured to include a receiver configured to receive GPS data, for example, for determining absolute positions based on the GPS data as well as range and bearing data reported by one or more of the communicators in the network. In this regard, since GPS data currently cannot be received underwater, a communicator configured for receiving GPS data directly from the source must be, for example, surface-mounted or have a non-submerged antenna or the like for receiving the GPS data. The received data can be passed from the receiving communicator to other communicators underwater. A communicator also can be configured so that a diver or other associated person can "tag" a relative location in the environment to facilitate return of the person to the location at a later time. These locations are sometimes referred to as "waypoints."

Alternatively to being hand-held, a communicator can have any of various other physical forms. For example, the transmitter portion of the communicator can be separated from other portions of the communicator and configured to be secured, for example, to a diver's backpack or tank head. In other examples, the receivers and transmitter are mounted on the backpack or tank head and a hand-held display is connected to the receivers and transmitter by a cable. In yet another example the receivers and transmitters are integrated into an existing product such as a dive computer, thereby allowing all the integrated devices to share data, power resources, display, and/or input devices. In yet other examples, the receiver and transmitter are mounted on a diver's hood or helmet while the display is either hand-held or wrist-mounted. In yet another example, the receivers and transmitter are head-mounted or helmet-mounted and are connected to a "heads-up" display located in the diver's mask or face-plate.

In additional examples, communicators can be configured for use by autonomous vehicles (AUVs) or remotely operated vehicles (ROVs) for navigation and control of the vehicles. In yet other applications the communicators can be configured for use in underwater-mapping applications and Geographic Information Systems (GIS) positioning systems. In such applications a communicator can provide absolute positioning information usable by other communicators in the network if the position of the communicator is known.

Time-stamped data networks, as summarized above, are not restricted to aquatic media or environments; they can be configured for use in any environmental medium in which time-stamped communication is useful or necessary. The time-stamped communications can be based on electrical or acoustic signals between communicators. For example, a network of communicators can be configured for avalanche-rescue work or search-and-rescue in general, in either submerged or terrestrial environments, including cave environments and any of various industrial environments such as tanks, reservoirs, enclosures, buildings, and other structures. Many terrestrial applications may benefit from easy access to GPS data for absolute geographic-position information and for synchronizations performed without the need to bring the communicators into close physical proximity (as in the case of acoustic devices used underwater) for synchronization. GPS data can be included in the messages sent along with the time-stamped messages transmitted between communicators.

The features and advantages summarized above will be more readily apparent from the following detailed description, which proceeds with reference to the accompanying drawings.

DETAILED DESCRIPTION

The description below is set forth in the context of representative embodiments that are not intended to be limiting in any way.

Figure 1A:
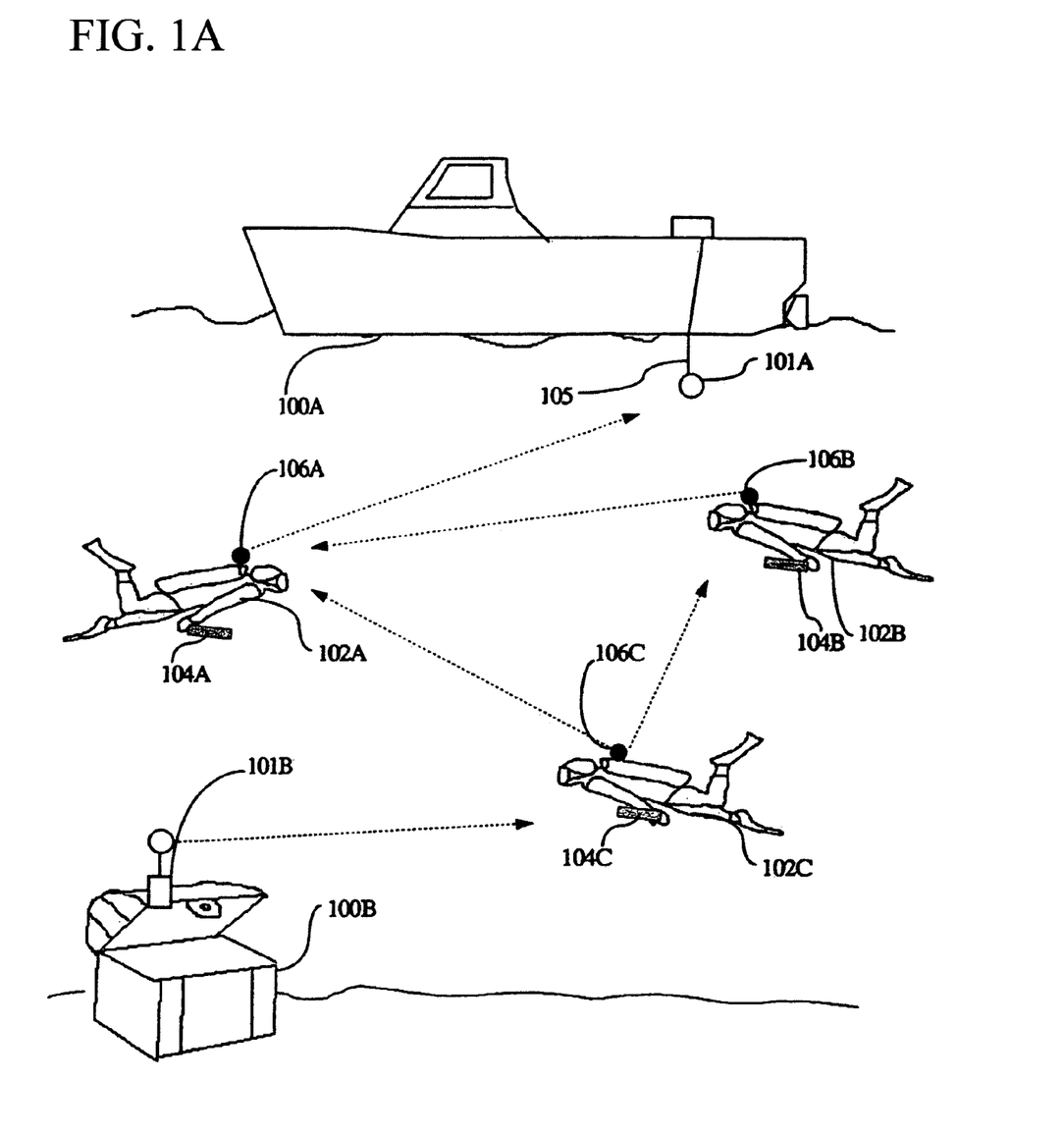
FIG. 1A schematically illustrates a group of divers each provided with respective communicator according to a representative embodiment, wherein each communicator is configured to transmit a respective time-stamped message.

Reference is first made to FIG. 1A, depicting a dive boat 100A and three submerged divers 102A, 102B, 102C. Each diver is provided with a respective communicator 104A, 104B, 104C, according to a representative embodiment that is especially configured for use underwater. Each communicator 104A–104C is enclosed in a respective housing and includes a respective acoustic antenna or acoustic transceiver 106A, 106B, 106C. In FIG. 1A, the acoustic antennas 106A, 106B, 106C are shown electrically connected to but separate from the housings of the respective communicators 104A–104C. Alternatively, the acoustic antennas 106A–106C can be attached to or situated inside the respective housings of the communicators 104A–104C.

Another communicator 101A is shown in FIG. 1A as being associated with the dive boat 100A, specifically suspended from and connected to the dive boat via a cable 105. Yet another communicator 101B is associated with a location of interest 100B (e.g., a submerged object). Although FIG. 1A depicts a group of three divers 102A–102C, it will be understood that this number is not limiting in any way. Desirably, however, each diver 102A–102C is provided with a respective communicator 104A–104C.

The respective communicators associated with the dive boat 100A and the location of interest 100B can be mobile communicators (e.g., of the type carried by the divers) simply placed in their respective locations. Alternatively, these respective communicators can be configured for placement or attachment at fixed locations. In addition, the respective communicators 104A–104C associated with the divers 102A–102C can have a configuration facilitating use in a hand-held manner, or alternatively can be attached to the respective divers or to their diving equipment. For example, a communicator can be secured to a portion of a diver's SCUBA apparatus.

Each communicator 104A–104C, 101A–101B can be provided with one or more transceivers (each transceiver including a respective message receiver and a respective message transmitter) each configured to communicate with other communicators in a network of communicators. In practice, each diver 102A–102C in the submerged group is provided with a respective communicator 104A–104C. Each communicator includes a respective internal clock that is synchronized with the respective clocks in the other communicators. The clock can be any of various electronic clocks, counters, oscillators, and the like, and can be synchronized by being set to a particular time that is common for all the respective clocks in the network, or can be synchronized by offset. Synchronization by offset involves the determination of and storage for calculation the time difference between respective clocks in different communicators of the network. Thus, the respective clock of each communicator in the network can be substantially synchronized without having to reset their respective clocks, timers, or oscillators to a common time.

The synchronization is sufficiently accurate so that delays associated with message-signal propagation (such as acoustic-propagation delays) do not introduce an unacceptable magnitude of synchronization errors.

By way of example, a fixed communicator such as the communicator 101A suspended from the dive boat 100A is configured to initiate a synchronization message (e.g., an acoustic pulse sequence) transmitted to the other communicators 101B, 104A, 104B, 104C. During this acoustic-signal synchronization routine, the other communicators 101B, 104A, 104B, 104C desirably are situated as closely as practicable to the communicator 101A to avoid significant delays between transmission and reception of the pulse sequence. Based on respective signals from the other communicators sent upon receipt of the pulse sequence, the fixed communicator 101A indicates, as applicable, successful receipt of synchronization signals from the other communicators. In another example, the respective clocks in the individual communicators are synchronized with each other based on a received optical or radiofrequency (RF) clock signal sent and received in a manner by which significant propagation delays that otherwise could occur with acoustic synchronization signals are generally negligible. I.e., synchronizations performed without having to rely upon an acoustic synchronization signal generally can be performed without the communicators being situated proximally to each other. In addition, such synchronizations can be re-established as required without the need for such proximity.

At least one of the communicators is configured to transmit, after completion of synchronization, a time-stamped message. If the communicators are situated underwater, the time-stamped message typically is transmitted as an acoustic signal encoding the time moment at which the message was transmitted. Thus, this transmitted message is a "time-stamped" message. The time-stamped message can be transmitted (a) periodically, (b) upon demand, (c) randomly, or (d) at arbitrary time intervals.

In a specific example, a communicator 104A is configured to transmit time-stamped messages at predetermined time intervals based on an identification number assigned to the particular communicator. More specifically, and by way of example, the communicator 104A is assigned the identification number (i.e., user ID number) "1" that is associated with transmission of each time-stamped message from the particular communicator 104A. Each time-stamped message includes the time of message transmission at every odd second plus 0.11 second. Consequently, the communicator 104A transmits time-stamped messages at times 1.11 sec, 3.11 sec, 5.11 sec, . . . By way of example, time-stamped messages can be transmitted at odd-numbered seconds by remote or mobile communicators, while time-stamped messages can be transmitted at even-numbered seconds by fixed communicators such as the communicator 101A. Additional mobile communicators can be configured to transmit time-stamped messages at, for example, odd-numbered seconds plus 0.21 sec, 0.31 sec, . . . , associated with respective "user-identification numbers" assigned to the communicators (e.g., numbers 2, 3, . . . , respectively). User-identification numbers can be re-assigned as needed, and a mobile communicator 101A that is fixed to, for example, the boat 100A can be configured to transmit at odd-numbered seconds plus a time increment based on the particular assigned user-identification number of the communicator. For example, the mobile communicators 104A–104C can be configured to transmit at the times 2.11 sec, 4.11 sec, . . . .

Figure 1B:
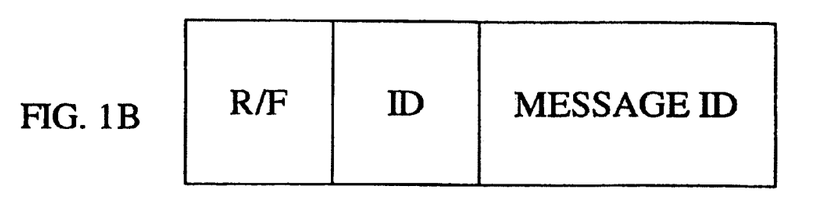
FIGS. 1B–1D show exemplary respective time stamps associated with respective ones of the communicators shown in FIG. 1A.
Figure 1C:
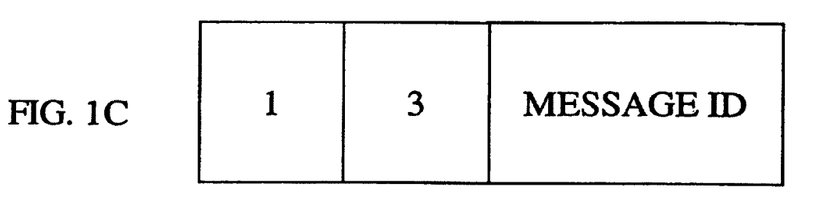
Figure 1D:
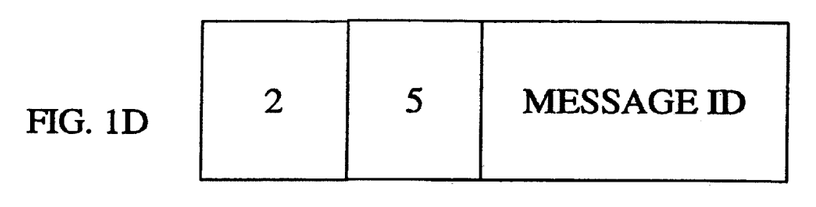

FIGS. 1B–1D illustrate exemplary respective formats for time-stamped messages. In each depicted time-stamp, the first (left-hand) field is denoted "R/F," which indicates whether the respective communicator is a remote (R) unit or fixed (F) unit. The second field is denoted "ID," which indicates the assigned user identification number for the respective communicator. Remaining fields or digits in the time stamp can be associated with any of various fixed or variable messages. In the depicted examples, FIG. 1C illustrates a time stamp for a remote communicator having an assigned user-identification number ("User ID") of "3," and FIG. 1D illustrates a time stamp for a fixed communicator having an assigned User ID of "5." These time stamps are transmitted by the respective communicators at the times corresponding to the respective time stamps.

In these examples, each User ID can be associated with a respective tenths digit of a time-stamped message. The message type can be provided in 100ths or other digit places. For example, messages associated with requests for emergency assistance, notification of intent to return to the dive boat, or any of various other messages can be associated with particular digit places. In some examples, one or more separation digits can be provided.

As a communicator receives a time-stamped message, respective data is provided to the other communicators (fixed and mobile) as to whether the transmission was from a remote communicator or from a communicator associated with a particular diver. Other data provided by the message can include a determination of the respective range(s) to other communicator(s). Typically, reception of a time-stamped message by a particular communicator is associated with the local clock time of that communicator.

For example, a message including the time stamp "1.11" is received by a communicator at a time of 1.5500 sec, relative to the time on the respective clock associated with the receiving communicator (and synchronized with the respective clock associated with the transmitting communicator). This particular time stamp indicates that the message was transmitted by the transmitting communicator, having Unit ID=1, at the time of 1.11 sec. Using these data the receiving communicator can determine its distance (range) from the transmitting communicator, based on the time difference (1.55 sec–1.11 sec=0.44 sec) and the propagation velocity of the time-stamped message from the transmitting communicator to the receiving communicator. Thus, using this one-way "time-of-flight" data concerning receipt of messages transmitted from other communicator(s) in a network, each communicator can determine, relative to the other communicator(s), the range and bearing of the other communicator(s). The receiving communicator can be provided with a display configured to reveal the real-time positional relationship of the communicator (and thus of the thing or person with which the communicator is associated) with the other communicator(s). For example, a diver associated with a particular communicator can determine his position, in real time, to other divers having respective communicators, as well as to a dive boat. This information can be combined with any of various other messages encoded in the time-stamped messages, which allow, for example, each diver to know the status of the other divers and to come to the assistance of a diver in distress, as required.

The exemplary time-stamped messages are illustrated in FIGS. 1B–1D as using a base-10 representation. Alternatively, the messages can use another representation such as a binary representation.

Assignment of respective transmission times of predetermined time-stamped messages permits a person (e.g., a diver) to communicate with a selected other person(s) (e.g., another diver or a person on the dive boat) without interference from communications from yet other persons (e.g., other divers) in the group. In other examples, the communicators can be configured to transmit randomly or at uncontrolled time intervals. However, message "collisions" can arise in situations involving random or otherwise uncontrolled transmissions of time-stamped messages, which can be undesirable under conditions in which the message collisions corrupt the respective transmissions. By transmitting in controlled time-based sequences (e.g., regular sequences), message collisions are effectively avoided.

Figure 2:
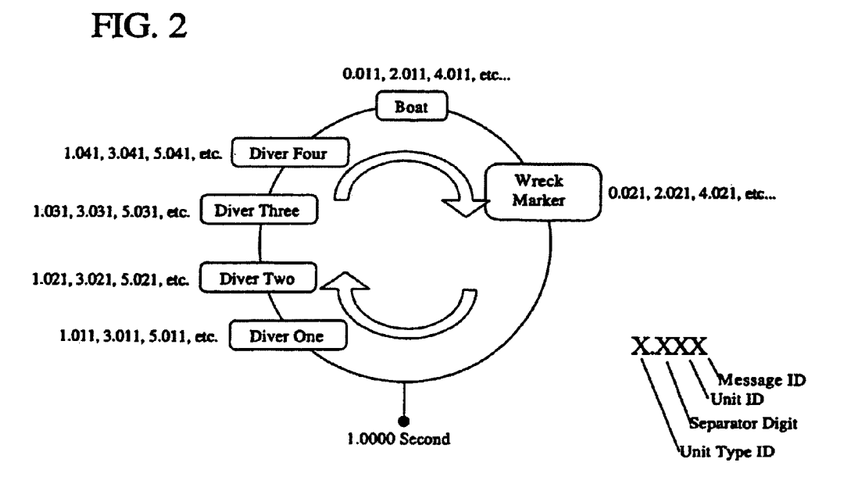
FIG. 2 schematically depicts exemplary network timings for the respective communicators worn by four divers as well as for a communicator provided on a dive boat and a communicator provided at an extraneous stationary location.

An exemplary timing diagram for transmissions from multiple communicators in a representative network is shown in FIG. 2. The subject network includes the respective communicators worn by each of four divers as well as respective communicators associated with a dive boat and with an underwater site such as a wreck marker. Assigned respective transmission times are depicted for each of the communicators, and each communicator has a unique User ID. Each communicator is configured to transmit at its respective assigned time within, in this example, a 2-second timing loop so as to prevent message collisions and to ensure passive control of the network. In the depicted example, the respective time-stamps are configured so that the stationary communicators (associated with the dive boat and the wreck marker) transmit on even seconds plus a respective time increment that is specific to each respective User ID. The communicators associated with the divers transmit on odd seconds plus a respective time increment that is specific to each respective User ID. The final digits in each time-stamped message are associated with particular messages, based on a set of pre-assigned message IDs.

Desirably, the message transmissions from the communicators are repeated continuously. Meanwhile, interactive messages between communicators can be sent without the need for bidirectional communications. For example, a particular communicator can be configured to determine the strength of a signal received from another communicator and to insert a request for signal-strength adjustment (increase or decrease) in a subsequent message. These types of messages can be associated with specific respective message IDs.

Figure 3:
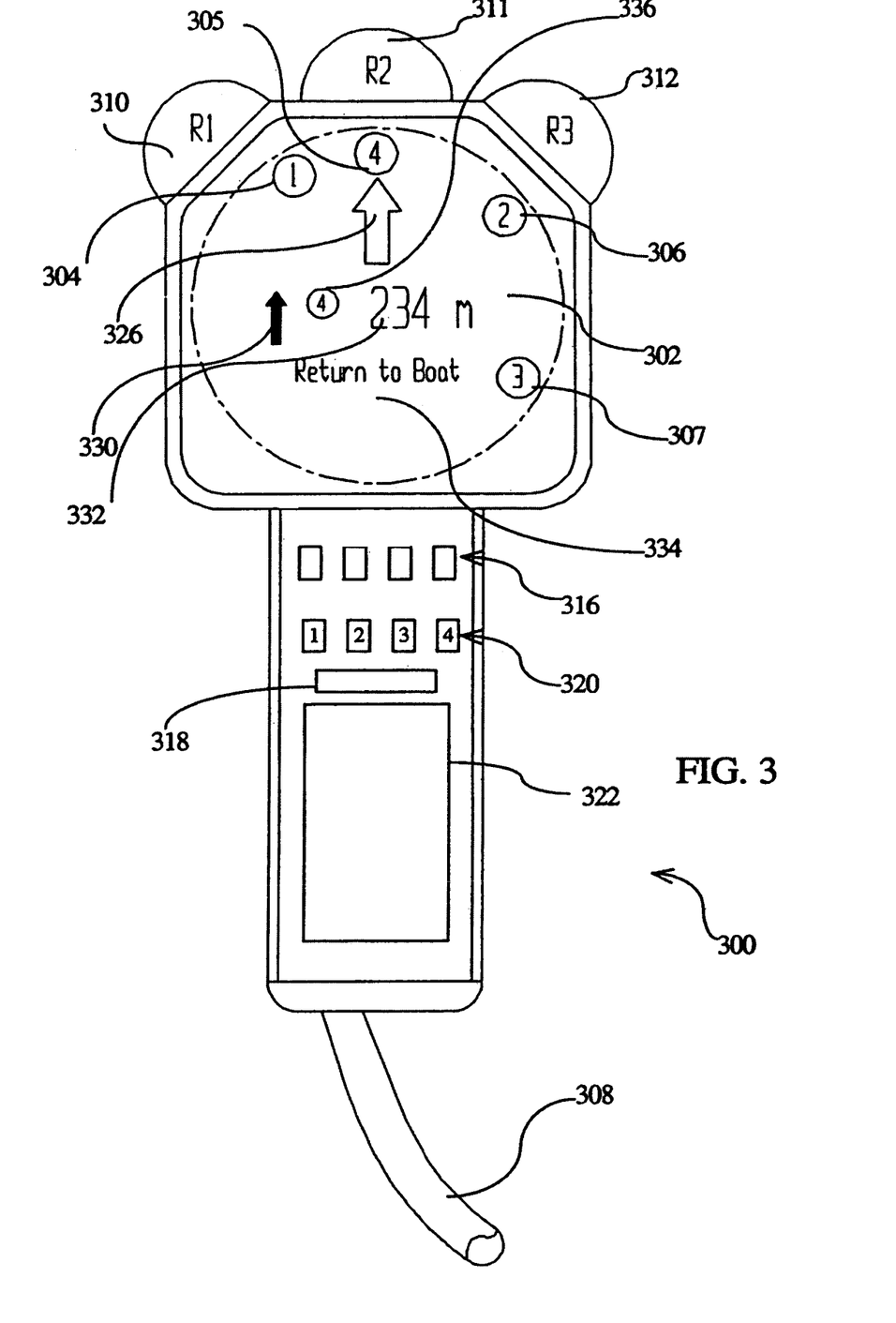
FIG. 3 is a plan view of a representative embodiment of a communicator configured to transmit and receive time-stamped messages and configured in the depicted embodiment to be hand-held.

Turning now to FIG. 3, a representative embodiment of a hand-held communicator 300 includes a display 302 configured to indicate respective locations of one or more other communicators in the network. For example, the network comprises a team of multiple divers each having a respective communicator. Diver locations are revealed on the display 302 by respective markers 304, 305, 306, 307. A cable 308 or other interconnection electrically connects the hand-held communicator 300 to an antenna or the like situated at or on, for example, a backpack (not shown) worn by the respective diver. The communicator 300 includes three receivers 310, 311, 312 each configured to receive messages from other communicators. The communicator 300 also includes one or more function keys 316, a synchronization key 318, a message-selection keypad 320, and a keypad 322 for entering additional messages. In the depicted example the three receivers (denoted R1, R2, R3, respectively) are situated about the body of the communicator 300.

The display 302 can be, for example, an LCD display. The depicted example includes an LCD "screen" depicting several "divers" 304, 305, 306 located at respective positions relative to the communicator 300. The relative bearing of each of the divers 304, 305, 306 is indicated by the position of the respective icon on the LCD "screen." A large arrow 326 as displayed on the "screen" indicates the direction in which the communicator is pointing. To display the distance to a particular diver indicated on the screen, the communicator 300 is turned until the large arrow 326 is pointing at the icon for the respective diver (and thus at the respective diver). The distance to the diver is displayed below the arrow 326 in a respective display area 332 on the LCD "screen." A small arrow 330, shown to the left of the distance display, indicates whether the communicator worn by the selected diver is located above or below the displaying communicator 300. This relative elevation display can be especially advantageous in three-dimensional environments such as the underwater environment in which divers work. Other messages can be displayed in a message region 334 of the "screen."

The display 302 also can be configured to display ranges and bearings to other communicators in the network in a cyclical manner. For example, a selected remote communicator can be highlighted, using a function key, as a relatively dark or light icon, and the large arrow 326 and small arrow 330 can be made to point correspondingly, accompanied by a display of appropriate range and relative depth. A selected diver indicator 336 also can be configured to include a User ID or other indication of the particular remote communicator for which range and bearing data currently are being displayed.

Figure 4:
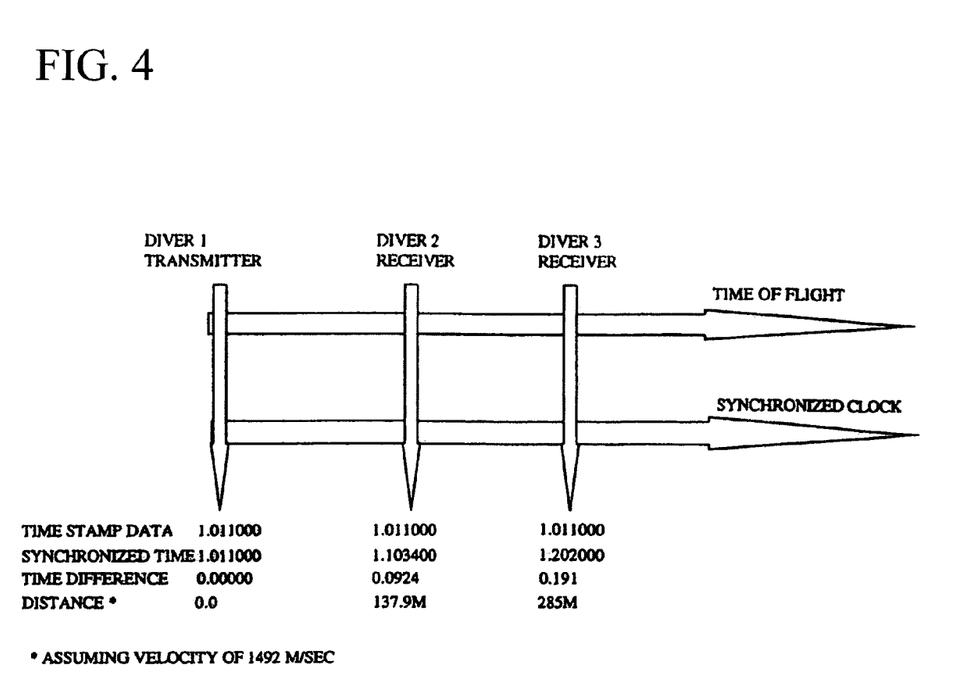
FIG. 4 illustrates an exemplary calculation of ranges, based on time-stamped data, as performed by an embodiment of a communicator.

FIG. 4 illustrates an exemplary calculation of range, using time-stamped data, as performed by an embodiment of a communicator. The communicator 402 acoustically transmits a time stamp "1.01100" to other communicators 404, 406 that receive the time stamp and store message-receipt times of, for example, 1.103400 sec and 1.202000 sec, respectively. The transmission times between the communicators 402, 404 and 402, 406, respectively, are calculated from these data. Using data regarding the acoustic-propagation velocity in water, the respective ranges are calculated.

Figure 5:
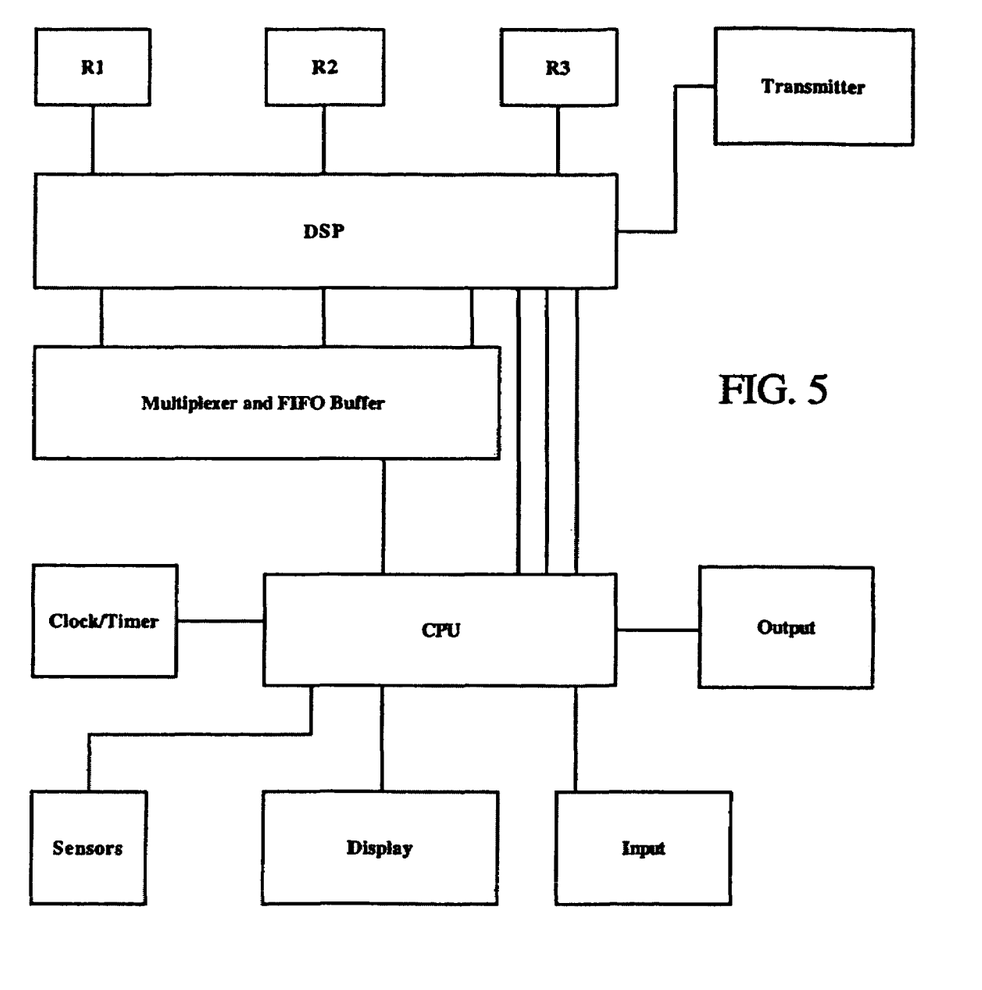
FIG. 5 is a block diagram of an embodiment of a communicator including three receivers for determining range and bearing of other communicators remote from the depicted communicator.

FIG. 5 is a block diagram of representative control architecture of the communicator unit shown in FIG. 3. The diagram depicts three receivers (R1, R2, R3) and one transmitter that pass signals to and from a DSP (digital signal processor) unit for filtering and signal processing. Use of three receivers R1, R2, R3 facilitates determinations, by the depicted communicator, of accurate range and bearing data based on respective time-stamped messages sent from a remote communicator. (As an alternative to three receivers, a communicator having multiple receivers can have, for example, two or four receivers. Using more than four receivers per communicator usually is not necessary. It will be understood that the spatial positioning and orientation of the receivers can be important for accurate determinations of range and bearing of a remote communicator.) The depicted communicator includes a CPU (central processing unit) that calculates ranges and bearings from data encoded in signals routed to the CPU from the DSP and from data from the on-board synchronized clock/timer. The CPU displays the calculated range and bearing data on an LCD screen or other display. Other sensors are added as required for, e.g., providing velocity-correction factors due to variations in temperature or salinity of water and to variations in hydrostatic pressure. An input and an output are provided to allow the CPU to receive commands from the diver (or other person with which the communicator is associated) and to alert the person audibly, visually, and/or mechanically to alarm conditions.

Figure 6:
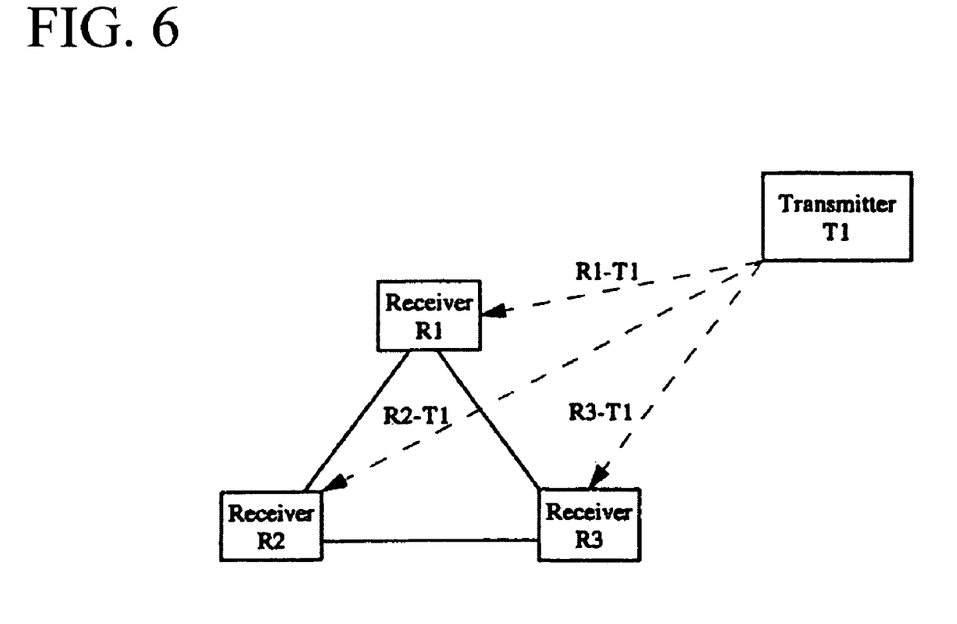
FIG. 6 depicts an exemplary determination of location and range, by a first communicator, of a second communicator such as worn by a diver remote from the first communicator, based on a time-stamped message received by the first communicator from the second communicator.

FIG. 6 depicts a representative method by which a transceiver-type of communicator such as that of FIG. 3, including three receivers and a synchronized clock, and using time-stamped messages received from a remote communicator, determines the location and range of a remote communicator. The time stamp of the message received by the each of the three receivers is subtracted from the respective times of reception by the receivers (as determined by the synchronized clock of the receiving communicator). The time difference is multiplied by the velocity of sound in the particular medium (e.g., water), thereby allowing the relative distance between the transmitting communicator and the receiving communicator to be calculated. More specifically, in this example, the acoustic velocity of sound through water is 1492 m/s. If the time difference at receiver R1 (i.e., R1−T1=1.10340 s−1.01100 s=0.0924 s), then the transmitter T1 (associated with the remote communicator) is calculated to be 137.9 m from the receiver R1. The bearing of the transmitter T1 relative to the receiving communicator is found by comparing the respective receiving times at receivers R1 and R3.

Figure 7:
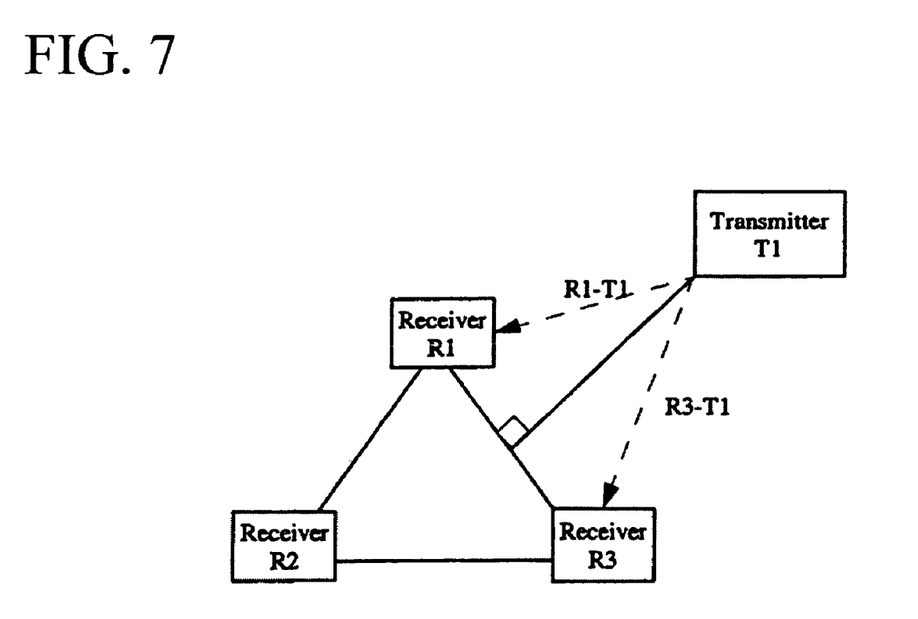
FIG. 7 illustrates an exemplary determination of location and bearing, by a first communicator, of a second communicator such as worn by a diver remote from the first communicator, based on a time-stamped message received by the first communicator from the second communicator.

FIG. 7 illustrates a representative method for calculating location and bearing of a remote communicator (having transmitter T1) by a receiving communicator having three receivers R1–R3, based on respective time-stamped messages transmitted from the remote communicator. The receiving communicator has a clock that is synchronized with the respective clock in the remote communicator. Using respective time differences associated with arrival times of time-stamped messages received by the three receivers R1, R2, R3, a bearing relative to a line drawn between any two receivers is calculated. For example, if R1−T1=R3−T1, then T1 is located on a perpendicular (90°) plane to a line extending between the receivers R1 and R3. Including the receiver R2 removes any residual ambiguity resulting from a calculation involving only R1 and R3. This method makes use of a very short baseline. Linking together communicators that are a substantial distance apart from each other would provide a long-baseline solution.

The disclosure describes several representative methods and apparatus. It will be appreciated that these methods and apparatus can be modified in arrangement and detail. For example, although the described communicator embodiments communicate with each other via acoustic signals, which are especially advantageous in an underwater environment, communicator networks alternatively can be configured to communicate via radiofrequency (RF) signals or via optical signals for use in terrestrial applications. Similarly, tracking of people or other objects can be determined. I claim all that is encompassed by the appended claims.

What is claimed is:

1. A method for determining a distance between a first location and a second location, comprising:
   at one or more predetermined time moments in a loop of a time cycle, transmitting respective messages from the first location to the second location so as to be received at the second location, the messages including respective time stamps encoding respective times of transmission of the messages from the first location, and the time moments being separated in time from each other by predetermined time intervals;
   with respect to one or more of the messages, comparing the respective time stamp of the message received at the second location with a respective local clock time of receipt of the message at the second location to obtain a time difference; and
   determining the distance based on the respective time difference and on data pertaining to a propagation velocity of the message from the first location to the second location.

2. The method of claim 1, wherein the message is transmitted acoustically from the first location to the second location.

3. The method of claim 1, further comprising the step of displaying the distance.

4. The method of claim 3, wherein the step of displaying the distance comprises displaying the real-time distance.

5. The method of claim 1, further comprising:
   transmitting the message, with respective time stamps, from a plurality of transmitting locations including the first location;
   at the second location, associating corresponding message-reception times from each of the plurality of transmitting locations; and
   determining respective distances of one or more of the transmitting locations relative to the second location based on the corresponding message-reception times.

6. The method of claim 5, wherein the determining step further comprises determining respective bearings of one or more of the transmitting locations relative to the second location based on the corresponding message-reception times.

7. The method of claim 6, further comprising the step of displaying the distances and bearings.

8. The method of claim 5, wherein each message from a transmitting location includes a respective user-identification code for the transmitting location.

9. The method of claim 1, wherein the time-stamped messages are repeatedly transmitted from the first location at a predetermined fixed time interval.

10. The method of claim 1, further comprising transmitting the messages, with respective time stamps, from a plurality of transmitting locations including the first location, wherein each of the transmitting locations has a respective predetermined time interval at which a respective time-stamped message is transmitted from the respective location.

11. The method of claim 1, further comprising:
    transmitting respective messages from each of multiple transmitting locations including the first and second locations, each message from a particular transmitting location having a respective time stamp;
    receiving the messages at one or more receiving locations among the transmitting locations;
    associating a corresponding message-reception time with each received message at each of the receiving locations;
    comparing the message-reception times with respective clock times at the receiving locations; and
    determining a respective bearing and distance of one or more of the transmitting locations relative to at least one of the receiving locations based on the corresponding message-reception times.

12. The method of claim 11, wherein the associating step performed at each receiving location comprises:
    providing data concerning a time of receipt of the message at the receiving location; and
    comparing the respective time stamps with a respective local clock time at the receiving location, each respective local clock time being synchronized with respective local clock times at the other receiving locations.

13. The method of claim 11, wherein the respective messages are transmitted from the transmitting locations at predetermined time intervals that are regular time intervals.

14. The method of claim 13, wherein the predetermined time intervals are different for each of the respective transmitting locations.

15. The method of claim 1, wherein each message encodes an identification of whether the first location is a fixed location or a moving location.

16. The method of claim 1, wherein each message from the first location is associated with a respective user-identification number for the first location.

17. The method of claim 1, wherein the transmitting, comparing, and determining steps are performed during movement of one of the first and second locations relative to the other of the locations.

18. The method of claim 1, wherein the message includes a preset message.

19. The method of claim 1, wherein the message includes an audible or visual notification for a user at the second location.

20. An apparatus for determining a position of a first location relative to a position of a second location, the apparatus comprising:
    a first communicator positionable at the first location and a second communicator positionable at the second location, wherein each communicator is configured to transmit, at one or more respective predetermined time moments in a loop of a time cycle, respective time-stamped messages to the other communicator and to receive respective time-stamped messages transmitted from the other communicator, the respective time moments of transmission from each communicator being separated in time from each other by predetermined time intervals;
    each of the first and second communicators comprising a respective clock, a respective controller configured to synchronize the respective clock in the communicator with another clock, and a respective processor configured (i) with respect to one or more of the messages received by the communicator, to recover a respective time stamp from the time-stamped message received by the respective communicator from the other communicator, (ii) to associate a respective local time, as determined by the respective clock, of receipt of the time-stamped message by the respective communicator, and (iii) to determine a respective propagation time of the message between the communicators based on a calculated difference of the respective local time from the respective recovered time stamp.

21. The apparatus of claim 20, wherein the message is transmitted acoustically.

22. The apparatus of claim 20, wherein the controller is configured to synchronize the respective clock in the communicator with a respective clock in the other communicator.

23. The apparatus of claim 20, wherein at least one respective processor is configured further to calculate a distance between the first and second communicators based on the calculated time difference and a propagation velocity of the time-stamped message over a distance between the first and second communicators.

24. The apparatus of claim 23, wherein the at least one respective processor further is configured to calculate a bearing of other communicator relative to the respective communicator, based on the calculated time difference and propagation velocity.

25. The apparatus of claim 20, wherein the at least one respective processor further is configured to calculate a bearing of the other communicator relative to the respective communicator, based on the calculated time difference and propagation velocity.

26. The apparatus of claim 20, further comprising a display configured to display the distance.

27. The apparatus of claim 26, wherein:
the at least one respective processor further is configured to calculate a bearing of the other communicator relative to the respective communicator, based on the calculated time difference and propagation velocity; and
the display is further configured to display the bearing.

28. The apparatus of claim 20, wherein each communicator comprises a plurality of receivers each configured to receive respective time-stamped messages transmitted, at multiple respective predetermined time moments in the cycle, from multiple respective other communicators.

29. The apparatus of claim 28, wherein the respective processor in each communicator further is configured (i) to recover the respective time stamp from each of the time-stamped messages received by the receivers, (ii) to associate respective local times, as determined by the respective clock in the communicator, of receipt of the time-stamped messages by the receivers, and (iii) to determine respective propagation times of the messages based on respective calculated differences of the respective local times from the recovered time stamps.

30. The apparatus of claim 29, wherein:
the respective processor in each communicator further is configured to determine respective distances, from the communicator to the other communicators; and
each communicator further is configured to display the respective distances.

31. The apparatus of claim 29, wherein:
the respective processor in each communicator further is configured to determine respective bearings, relative to the communicator, of the other communicators; and
each communicator further is configured to display the respective bearings.

32. The apparatus of claim 20, wherein one or more of the time-stamped messages includes a respective preset message.

33. The apparatus of claim 20, wherein one or more of the time-stamped message includes a selectable, pre-programmed message, sent by a user at the respective communicator, pertaining to a condition of the user.

34. The apparatus of claim 20, wherein the predetermined time interval corresponds to a respective user identification of the respective communicator.

35. The apparatus of claim 20, wherein at least one of the first and second communicators is configured to be hand-held by a respective user.

36. The apparatus of claim 20, wherein at least one of the first and second communicators is configured to be mounted on the body of a respective user.

37. The apparatus of claim 20, wherein at least one of the first and second communicators is configured to be mounted on a thing worn by a respective user.

38. The apparatus of claim 20, wherein:
each communicator has a pre-assigned user-identification code; and
each communicator is configured to transmit its respective time-stamped messages at predetermined respective time moments in the cycle, based on the respective user-identification code.

39. The apparatus of claim 20, wherein:
each communicator has a pre-assigned user-identification code and is operable to transmit a respective message identifier; and
the respective processor in each communicator is configured to recover the respective message identifier associated with the respective user-identification code of the communicator transmitting the message to the other communicator.

40. A method for communicating between at least a first person at a first location in an environment and at least a second person at a second location that either is in the environment or outside the environment, the method comprising:
at one or more predetermined time moments in a loop of a time cycle, transmitting respective messages, each comprising a time stamp, from the person at the first location to the second person at the second location so as to be received by the second person, each time stamp encoding a respective time of transmission of the respective message from the person at the first location, and the time moments being separated in time from each other by predetermined time intervals;
with respect to at least one of the received messages, comparing the respective time-stamp of the message received by the second person with a respective time at the second location, so as to obtain a respective time difference; and
determining a respective distance from the first location to the second location based on the respective time difference.

41. The method of claim 40, wherein:
the environment is an underwater environment; and
at least one of the persons is a diver in the underwater environment.

42. The method of claim 41, wherein the messages are transmitted acoustically through water in the underwater environment.

43. The method of claim 40, further comprising determining a respective bearing of the second location relative to the first location, based on the respective time difference.

44. The method of claim 40, wherein at least one of the messages includes a communication message from one of the persons to the other person.

45. An apparatus for use by divers in an underwater environment to achieve situational awareness by each of the divers, the apparatus comprising:

a respective communicator placed in association with each of the divers, each communicator being configured to transmit, at one or more respective predetermined time moments in a loop of a time cycle, respective time-stamped messages to the other communicators, each communicator also being configured to receive messages from the other communicators, each transmitted message including a respective time stamp encoding an identification number of the respective communicator and encoding a respective time of transmission of the message from the respective communicator, the time moments being separated in time from each other by predetermined time intervals;

each communicator comprising a respective clock, a respective controller configured to synchronize the respective clock in the communicator with another clock, and a respective processor configured (i) to recover the respective time stamp from each time-stamped message received by the respective communicator from another of the communicators, (ii) to associate a respective local time, as determined by the respective clock, of receipt of the time-stamped message by the respective communicator, (iii) to determine a respective propagation time of the message between the communicators based on a calculated respective difference of the respective local time from the recovered respective time stamp; and (iv) determine a respective distance from the respective controller to the other controller from which the message was transmitted.

46. The apparatus of claim 45, further comprising a display for displaying the respective distance information to the respective diver.

47. The apparatus of claim 45, wherein each communicator is configured to include, in the time-stamped message transmitted from the communicator, a personal message from the respective diver; and the display of the communicator receiving the time-stamped message is configured to display the personal message to the respective diver.

48. The apparatus of claim 45, wherein the processor further is configured to determine a bearing of the transmitting communicator relative to the receiving communicator.

49. The apparatus of claim 48, wherein the respective display of each communicator is configured to display both the distance and bearing of the transmitting communicator relative to the receiving communicator.

50. The apparatus of claim 45, wherein the communicators are configured to transmit their respective time-stamped messages acoustically through the water.

51. The apparatus of claim 45, wherein each communicator is configured to be hand-held by the respective diver.

52. A network communication system by which each of multiple persons in an environment establish situational awareness relative to other persons in the environment, the system comprising:

multiple respective communicators configured to be associated with the persons;

each communicator comprising at least one receiver, a transmitter, a clock, a controller, and a display;

the transmitter being configured to transmit, at one or more respective predetermined time moments in a loop of a time cycle, respective messages to at least one of the other communicators, wherein each message includes a respective time stamp encoding a respective time moment of transmission of the message, the time moments being separated in time from each other by predetermined time intervals, each time stamp being encoded in a portion of the respective message having sufficient length to contain the time stamp;

the receiver being configured to receive transmitted time-stamped messages from another of the communicators;

the controller being configured to perform synchronization of the clock with a time reference and to determine range and bearing of a transmitting communicator based on a calculated difference of the moment of transmission of the message from a moment of reception of the message by the respective communicator; and the display being configured to display the range and bearing.

53. The system of claim 52, wherein the controller is configured to perform synchronization of the clock with a master clock for all the communicators of the system.

54. The system of claim 52, wherein the transmitter is configured to transmit a digitally time-stamped message.

55. The system of claim 52, wherein the time stamp is encoded into the message by a method selected from the group consisting of amplitude modulation, frequency modulation, frequency-shift keying, and spread-spectrum techniques.

56. The system of claim 52, wherein each communicator transmits at a different frequency.

57. The system of claim 52, wherein each time-stamped message includes a recognition signal that can be recognized by a user associated with the receiving communicator.

58. A network communication system by which each of multiple persons in an environment establish situational awareness relative to other persons in the environment, the system comprising:

multiple communicators configured to be associated with each of the persons;

each communicator comprising multiple receivers, a transmitter, a clock, a controller, and a display, each transmitter being configured to transmit a respective message comprising a respective time stamp to the multiple receivers of each of the other communicators, each controller being configured to synchronize the clock in the respective communicator with another clock, and the display being configured to display a range and bearing;

wherein each controller is configured to (i) recover the respective time stamps from messages received by the receivers, the messages being transmitted by one or more respective communicators of the system, (ii) associate respective local times, as determined by the respective clock, of receipt of the messages by the receivers, (iii) determine respective propagation times of the messages based on respective calculated differences of the respective local times from the recovered messages, (iv) determine respective distances of the controller from the one or more respective transmitting communicators of the system; and (v) determine respective ranges and bearings of the one or more transmitting communicators based on respective calculated differences of the respective moments of transmission of the messages from the respective moments of reception of the messages by the receivers.

* * * * *